United States Patent
Mullen

(10) Patent No.: US 6,880,946 B2
(45) Date of Patent: Apr. 19, 2005

(54) GROOVED OPTICAL MICROSTRUCTURE LIGHT COLLIMATING FILMS

(75) Inventor: Patrick W. Mullen, Barkhamsted, CT (US)

(73) Assignee: Reflexite Corporation, Avon, CT (US)

(*) Notice: Subject to any disclaimer, the term of this patent is extended or adjusted under 35 U.S.C. 154(b) by 60 days.

(21) Appl. No.: 10/046,929

(22) Filed: Jan. 15, 2002

(65) Prior Publication Data
US 2003/0133301 A1 Jul. 17, 2003

(51) Int. Cl.⁷ .............................................. G01D 11/28
(52) U.S. Cl. ........................ 362/31; 362/26; 362/27; 362/333
(58) Field of Search .............................. 362/31, 26, 27, 362/339, 330–333; 427/162; 385/36, 130, 146, 147, 901; 349/62, 65; 359/454, 599, 831

(56) References Cited

U.S. PATENT DOCUMENTS

| 5,126,882 A | 6/1992 | Oe et al. ................. 359/619 |
| 5,394,255 A | 2/1995 | Yokota et al. ............. 359/49 |
| 5,396,350 A * | 3/1995 | Beeson et al. ............ 349/62 |
| 5,592,332 A | 1/1997 | Nishio et al. ............. 359/619 |
| 5,600,462 A | 2/1997 | Suzuki et al. ............. 349/112 |
| RE35,704 E | 12/1997 | Chiba et al. ............. 359/619 |
| 5,711,589 A | 1/1998 | Oe et al. ................. 362/31 |
| 5,730,518 A | 3/1998 | Kashima et al. ........... 362/31 |
| 5,771,328 A | 6/1998 | Wortman et al. .......... 385/146 |
| 5,816,677 A | 10/1998 | Kurematsu et al. ........ 362/31 |
| 5,838,403 A | 11/1998 | Jannson et al. ........... 349/65 |
| 5,841,572 A | 11/1998 | Ando et al. |
| 5,844,720 A | 12/1998 | Ohara et al. ............. 359/599 |
| 5,854,872 A | 12/1998 | Tai |
| 5,863,113 A | 1/1999 | Oe et al. ................. 362/31 |
| 5,919,551 A | 7/1999 | Cobb, Jr. et al. ......... 428/156 |
| 5,995,690 A | 11/1999 | Kotz et al. ............... 385/25 |
| 6,075,649 A | 6/2000 | Naito ..................... 359/619 |
| 6,277,471 B1 | 8/2001 | Tang |
| 6,322,236 B1 | 11/2001 | Campbell et al. .......... 362/333 |
| 6,424,396 B1 * | 7/2002 | Kim et al. ............... 349/130 |
| 2001/0001595 A1 | 5/2001 | Hosseini et al. |
| 2002/0105793 A1 * | 8/2002 | Oda et al. ............... 362/31 |
| 2002/0145860 A1 * | 10/2002 | Lee ...................... 362/26 |

FOREIGN PATENT DOCUMENTS

| EP | 0942 227 A1 | 9/1999 |
| EP | 1 006 400 A2 | 6/2000 |
| WO | WO 99/42861 | 8/1999 |

OTHER PUBLICATIONS

Patent Abstract for Japanese Publication No. 06324205, published Nov. 25, 1994.

* cited by examiner

Primary Examiner—Sandra O'Shea
Assistant Examiner—M Tsidulko
(74) Attorney, Agent, or Firm—Hamilton, Brook, Smith & Reynolds, P.C.

(57) ABSTRACT

A light collimating film includes a sheet having a first side and a second side. The first side can include a series of optical elements and the second side includes a series of stepped plateaus and a series of base planes that run along a first axis. The plateaus and base planes alternate along a second axis and the plateaus have an elevation different than the base planes.

28 Claims, 5 Drawing Sheets

US 6,880,946 B2

GROOVED OPTICAL MICROSTRUCTURE LIGHT COLLIMATING FILMS

BACKGROUND OF THE INVENTION

Brightness enhancing films (BEF) have been used in lighting panels for directing light from lighting fixtures through luminaires, laptop computers displays, and flat panel desk top monitors or displays. The brightness enhancing films, which can have linear prisms, diffuse light with a desired directionality. Often the films have been used in combination with a fluorescent light source. The films have had partial success in improving luminaire or display brightness by controlling the angle at which light emerges.

Optical films are often used in combination with other films or sheets. For example, two diffuse films and two collimating films are used as a stack on a light guide behind liquid crystal displays. Optical layers with smooth surfaces in close contact can form subtle objectionable patterns of Newton's rings or "cloudy patches" of unintended light distortions where films contact another causing a "wet out" appearance.

Therefore, a need exists for reducing the wet out between films while maintaining brightness.

SUMMARY OF THE INVENTION

The present invention includes a light collimating film having an optical structure film including a sheet having a first side and a second side. The first side includes a series of optical elements and the second side includes a series of stepped plateaus and a series of base planes that run along a first axis. The plateaus and base planes alternate along a second axis and the plateaus have an elevation different than the base planes.

In another embodiment, the invention includes a back lighting display device having a lighting device, a display panel, and a sheeting having a first side and a second side. The first side includes a series of optical elements. The second side includes a plurality of stepped plateaus and a plurality of base planes that run along a first axis. The plateaus and base planes alternate along a second axis and the plateaus are not coplanar with the base planes. The plateaus and base planes are connected by substantially perpendicular walls.

In a further embodiment, the invention includes a light collimating structure having a first collimating film having a first surface with a plurality of first linear prisms having peaks. A second surface has a plurality of stepped plateaus and a plurality of base planes. The plateaus have an elevation different than the base planes. The plateaus and base planes can be oriented in parallel relative to the peaks of the first linear prisms. A second collimating film has a first surface with a plurality of second linear prisms having peaks and a second surface having a plurality of stepped plateaus and a plurality of base planes. The plateaus have an elevation different than the base planes. The plateaus and base planes can be oriented in parallel relative to the peaks of the second linear prisms.

A method of forming a light collimating film is also provided which includes the steps of forming a series of linear prisms on a first side of a sheeting, the linear prisms including peaks; and forming a plurality of stepped plateaus and a plurality of base planes. The plateaus have an elevation different than the base planes on a second side of the sheeting with the plateaus. The base planes can be oriented in parallel to the peaks of the linear prisms. The method can further include the steps of forming a plurality of stepped plateaus and a plurality of base planes. The plateaus have an elevation different than the base planes on a second side of the second sheeting with the plateaus and base planes being oriented in parallel relative to the peaks of the linear prisms.

The present invention has the advantage of reducing wet out between the peak of a prism of a first film in contact with the window side of a second film while reducing Newton's rings and moiré fringes.

Figure 1:
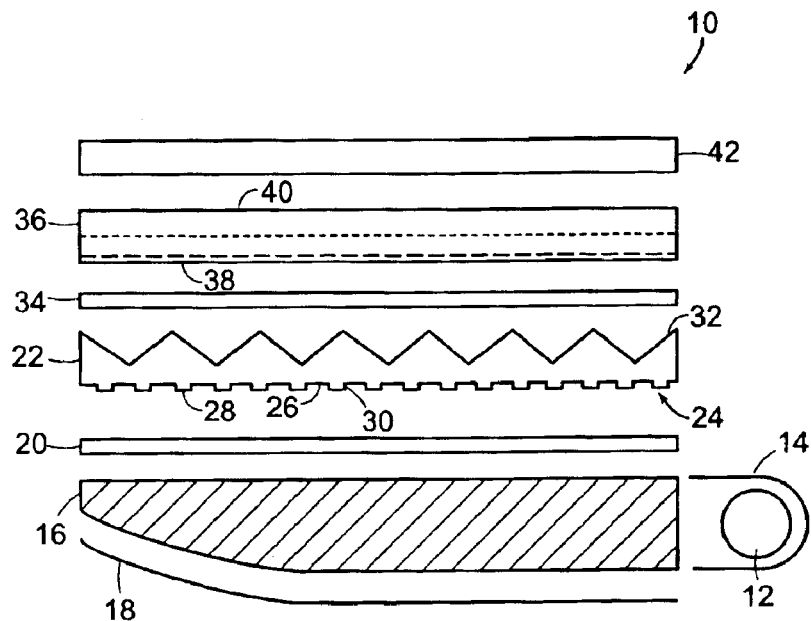
FIG. 1 illustrates a cross-sectional view of a backlighting system.

The foregoing and other objects, features and advantages of the invention will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention. All percentages and parts are by weight unless otherwise indicated.

DETAILED DESCRIPTION OF THE INVENTION

With respect to the optical performance of a collimating film, it has been found that for individual active matrix liquid crystal display back lighting system designs, the optical efficiency of the particular lamp, waveguide and diffuser system can be improved by designing a collimating film to maximize the use of the diffraction and refraction effects. For example, as shown in FIG. 1, a back lighting system 10 includes a light source 12 and light reflector 14. Light source 12 can be a fluorescent light, incandescent light or other suitable light source. Waveguide 16, which is for directing light out of back lighting system, can be formed of a transparent solid material and is often wedge shaped. On one side of waveguide 16 is waveguide reflector 18 formed of a specular material, such as aluminum or a coated white surface, for reflecting light back to waveguide 16. Waveguide reflector 18 can be curved or flat. Diffuser 20 is a film that diffuses the light from the waveguide into a substantially uniform distribution. An example of a suitable diffuser is a randomly textured surface or gradient index film or engineered diffractive structure.

Above diffuser 20, first collimating film 22 has grooved structure 24 on a first side adjacent waveguide 16. Grooved structure 22 has a series of base planes 26 and plateaus 28 which run along a first axis from one side of collimating film 22 to a second side of collimating film 22 to provide an unsmooth surface opposite the prism surface. Base planes 26 and plateaus 28 are connected by walls 30 which are substantially perpendicular to base planes 26 and plateaus 28. Walls 30 can be a few degrees off perpendicular to either base planes 26 and plateaus 28. Also, the walls can be curved. Base planes 26 and plateaus 28 are of such sizes to reduce the visibility of Newton's rings and moiré fringes while minimizing surface to surface contact with films or the peaks of prisms, thereby reducing wet out. The width of base plane 26 can be in the range of between about one and about 300 microns. In another embodiment, the width of base plane 26 can be in the range of between about 10 and about 200 microns. The width of plateaus 28 can be in the range of between about one and fifty microns. In another embodiment, the width of plateaus 28 can be between about 10 and about 50 microns. The ratio of the width of plateau 28 to the width of base planes 26 is in the range of between about one and about ten. In one embodiment, base planes have a width of about 150 microns (0.006 inches) and plateaus have a width of about 25 microns (0.001 inches). In another embodiment, base planes have a width of about 185 microns (0.0073 inches) and plateaus have a width of about 33 microns (0.0013 inches). Wall 30 can have a height in the range of between about 0.4 and about 0.8 microns which provides a difference in elevation between base planes 26 and plateaus 28 from a base point in the film. In an embodiment, the height of walls 30 is in the range of between about 0.5 and 0.8 microns. The difference in elevation between the base plane and plateaus can be less than about the wavelength of visible light. The dimensions of the width of the plateaus can each be less than about 3.175 microns ($1.25 \times 10^{-4}$ inches).

Second side of first collimating film 22 has prism structure 32. An optional abrasion reduction layer 34 is between first collimating film 22 and second collimating film 36. Abrasion reduction layer 34 can have a grooved structure on one or two surfaces to improve performance by reducing wetting. Second collimating film 36 has second grooved structure 38 on a first side adjacent first collimating film 22 and prism structure 40. Prism structure 40 of second collimating film 36 can be oriented in the same direction as the prisms on first collimating film 22. Alternatively, it may be offset by rotating the prism orientation up to about 180 degrees. In an embodiment, second collimating film 36 is rotated about ninety degrees with respect to the first collimating film to reduce moiré fringe formation and improve the uniformity of the exiting light distribution. Also, the peaks cross the grooved structure with minimal contact to reduce wet out between films. Above second collimating film 36 is liquid crystal display 42. A collimating film which has linear prisms designed with a tilt, size and included angle which match the light source, waveguide and diffuser properties provides enhanced performance. The advantages of employing linear prism arrays with included angles which range from ninety-five degrees to 120 degrees provides a light distribution which can be optimized for viewing angles of a computer screen. The included angle is considered the top angle of a triangular linear prism structure.

Figure 2:
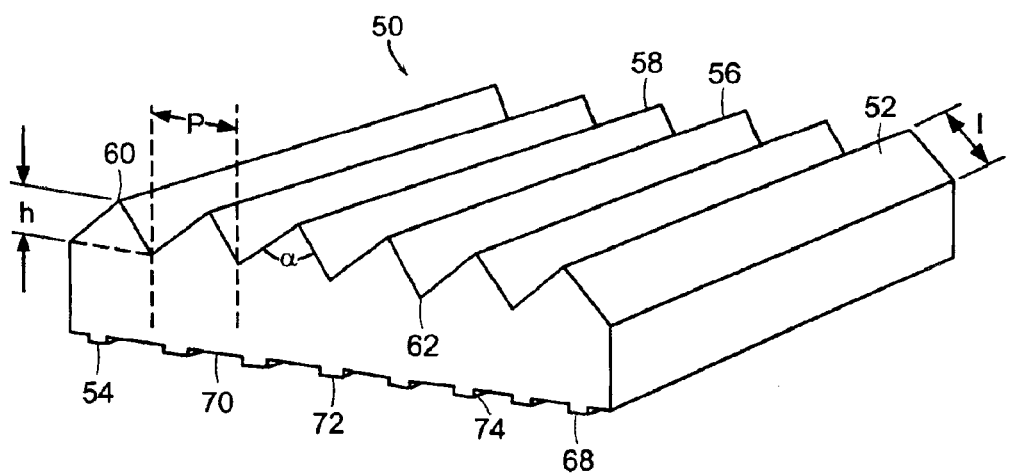
FIG. 2 illustrates a perspective view of a linear prism structure.
Figure 3:
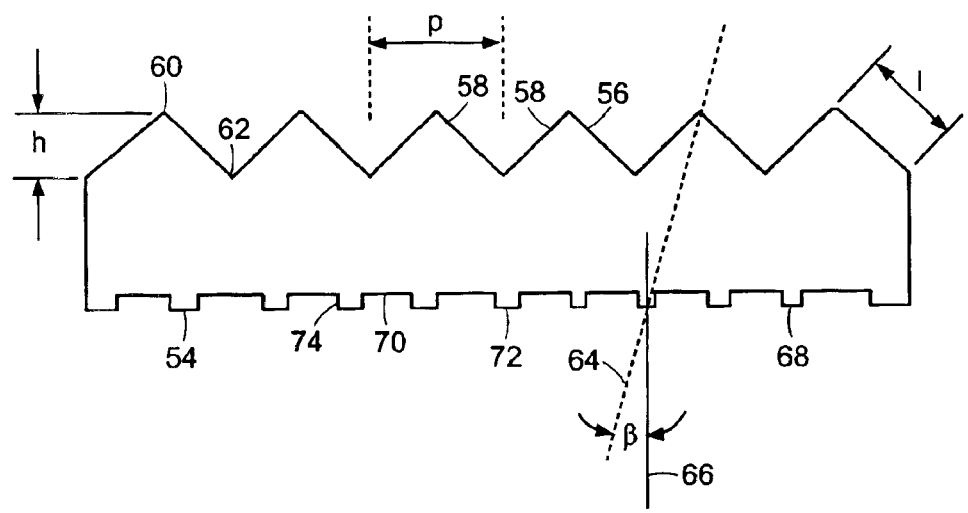
FIG. 3 illustrates a side view of the linear prism structure shown in FIG. 2.

An example of a linear prism film with a grooved structure is shown in a perspective view in FIG. 2 and in a side view in FIG. 3. Linear prism film 50 has first axis 51 and second axis 53. Linear prism film 50 has prism surface 52 and window surface 54 and is formed of a transparent polymeric material. Prisms 56 have sides 58 with peaks 60 and valleys 62. The pitch (p) of the prisms 56 is measured from valley 62 to next valley 62. The pitch can be in the range of between 25 and 76 $\mu$m (0.001 and 0.003 inches). The height (h) of the linear prisms is measured by the vertical distance from the valley 62 to peak 60. The height can be in the range of between 7.6 and 38 $\mu$m (0.0003 and 0.0015 inches). Included angle ($\propto$) is measured between the two sides that meet at peak 60. The angle ($\propto$) can range from about sixty to 120 degrees. In an embodiment, the angle ($\propto$) is in a range of between about sixty and eighty-five degrees or between about ninety-five and 120 degrees. Sides 58 on each side of peak 60 can be side length (l) from valley 62 to peak 60 to form an isosceles triangle. Alternatively, the sides can have different lengths, such as with a scalene triangle, thereby tilting or canting the prisms. Tilting angle ($\beta$) of the prisms is between optical axis 64 and line 66 perpendicular to window side 54. The prisms can be tilted in the range of between about −44 and +44 degrees. In an embodiment, the tilting is about seven degrees. Also the linear prisms can have additional sides with a base, such as a base with three or more additional sides.

On the non-prism side, grooved structure 68 has a series of base planes 70 and plateaus 72 which run in parallel with peak 60 to provide a rough surface opposite the prism side. Base planes 70 and plateaus 72 are connected by walls 74 which are substantially perpendicular to base planes 70 and plateaus 72. Base planes and plateaus are substantially parallel but not coplanar, thereby base planes having a different elevation from plateaus.

Prism structures 22, 40 are considered optical elements. Although the linear prisms are exemplified, many other optical elements or structures for redirecting light can be substituted or added. The optical elements can include linear prisms including triangular prisms (a base and two sides), four-or-more sided prisms (a base and three-or-more sides), and lenticular elements, such as linear lenticular elements. Examples of lenticular linear elements are disclosed in U.S. Pat. No. 5,592,332, issued to Nishio et al on Jan. 7, 1997, the teachings of which are incorporated herein by reference. Also, the optical elements are not necessarily linear. The optical elements can also include a textured surface, such as one formed with glass beads. In addition, Fresnel lenses and cube-corner prisms are other examples of optical elements.

Figure 4:
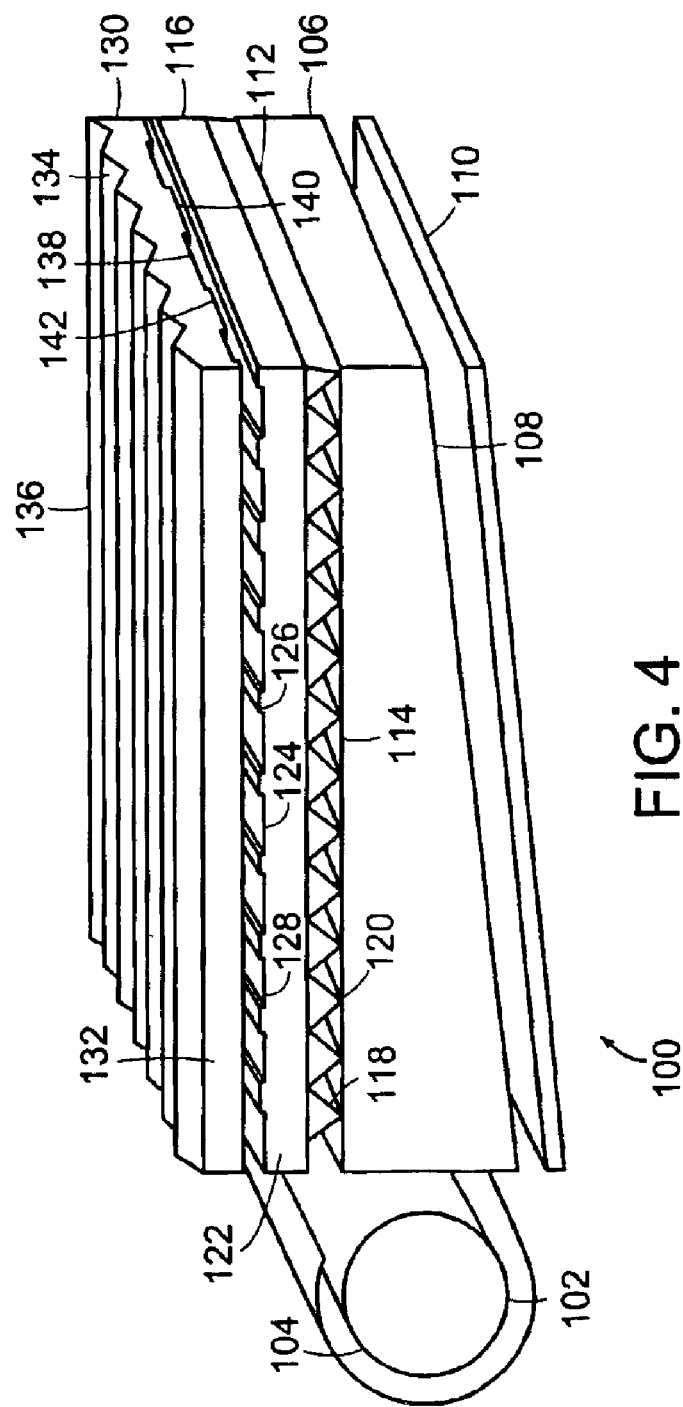
FIG. 4 illustrates a cross-sectional view of a second embodiment of a back lighting system.

Another embodiment of the present invention is shown in FIG. 4. A back lighting system 100 includes a light source 102 and a light reflector 104. Waveguide 106 can be formed of a transparent solid material and can be wedge shaped. Adjacent to the first side 108 of waveguide 106 is waveguide reflector 110 formed of a specular reflecting material. The reflector 110 is spaced slightly away from surface 108 to allow total internal reflection at surface 108 to take place. Alternatively, the reflector can have a grooved structure on the side facing waveguide 106. The grooved structure of the reflector can be coated with a specular reflecting material. Alternatively, if the reflector 110 were transparent, the reflector can be coated on the side away from waveguide 106. First side 108 can be stepped in shape. Second side 112 of waveguide 106 is on the opposite side away from waveguide reflector 110. Second side 112 can have grooved structures 114.

Above waveguide 106, first collimating film 116 has first prism structure 118 with peaks 120 pointed toward waveguide 106 and first grooved structures 122 on the window side of first prism structure 118. The peaks of linear prisms on first collimating film 116 can run parallel to light source 102. First grooved structure 122 has base planes 124 and plateaus 126 that are in parallel with peaks 120 to provide a non-smooth structured surface. Base planes 124 and plateaus 126 are connected by walls 128 Walls 128 can be substantially perpendicular to base planes 124 and plateaus 126, which includes walls 128 that can be a few degrees off perpendicular to either base planes and plateaus. Also, the walls can be curved. Base planes and plateaus are substantially parallel but not coplanar. Above first collimating film 116, second collimating film 130 has second grooved structure 132 and second prism structure 134. Peaks 136 of second prism structure 134 point away from waveguide 106. Second grooved structure 132 has base planes 138 and plateaus 140 which are in parallel with peaks 136 to provide a non-smooth structured surface. Base planes 138 and plateaus 140 are connected by walls 142. Base planes and plateaus are substantially parallel but not coplanar. The peaks 136 of second prism structure 134 can be oriented in a non-parallel direction to peaks 120 of first prism structure 118. Another orientation is ninety degrees.

In one embodiment, first grooved structures 122 are oriented in parallel to the peaks of the linear prisms on first collimating film 116. In one embodiment, angle ($\propto$) of the linear prisms on first collimating film 116 is about eighty-eight degrees. In another embodiment, angle ($\propto$) is about eighty-nine degrees.

Second grooved structure 132 can be oriented in parallel relative to the peaks of second collimating film 130. In one embodiment, angle ($\propto$) of the linear prisms on the collimating film 116 is about eighty-eight degrees. In another embodiment, angle ($\propto$) is about eighty-nine degrees or alternatively, eighty-nine degrees. Grooved structures 122, 132 are oriented about in parallel relative to the linear prisms of respective collimating films 116, 130.

In the embodiment having eighty-eight degree linear prisms on collimating films 116, 130 with grooved structures 122, 132 oriented at about ninety degrees relative to respective linear prisms, a performance comparable to commercially available brightness enhancing films having ninety degree prisms has been achieved.

In the embodiment having eighty-nine degree linear prisms on collimating films 116, 130 with grooved structures 122, 132 oriented about in parallel relative to respective linear prisms, a two to three percent performance increase over commercially available brightness films having ninety degree prisms can be achieved.

The performance of TIR (total internally reflecting) films, often called BEF (brightness enhancing film), which are used to increase the light output from back lighting systems in active matrix liquid crystal display flat panel displays can be improved by changing the tilt angle of the linear prism, the linear prism included angle and also the pitch of the linear prism array. A further improvement can be made by forming the film monolithic or polylithic. A monolithic film removes one material interface (at the substrate) and improves optical transmission. In the case of the polylithic film, a diffuser can be incorporated into the film structure saving the need to fabricate a separate diffuser and dependent on the degree of collimation required.

A fine pitch of a linear corner cube prism structure can provide suitable performance as a first layer in a back lighting system if a diffuser is not employed between the top smooth surface of a waveguide and a flat surface of the linear micro corner cube sheet. A fine pitch, such as in the range of between about 1.3 and 2.5 $\mu$m (0.00005 and 0.0001 inches), of the corner cube array helps to spread the refracted and retroreflected light by diffraction creating increase diffusion of recycled light. In another embodiment, the pitch is about 1.9 $\mu$m (0.000075 inches). The refracted and retroreflected light is spread by one to two degrees depending on the accuracy of the linear corner cube array dihedral angles. This spreading can be then increased by diffuse structures on the second surface of the waveguide creating a smooth diffuse light pattern without the need of the diffuser between the waveguide and linear corner cube collimating sheet. In addition, the grooved structure in the linear corner cube array is oriented in directions which do not modulate with the diffuse dot pattern on the rear of the waveguide. Therefore, moiré fringes are not created. A surface is disclosed in U.S. Pat. No. 5,600,462, issued to Suzuki et al. on Feb. 4, 1997, the teachings of which are incorporated herein by reference, which employs a rough structure 10 $\mu$m (0.004 inches), for performing diffuse transmission to create a "ground glass-type diffusion."

Also, it has been found that the addition of one or two ninety-five degree linear prism sheet(s) with 0.0019 inch (48 $\mu$m) pitch above the fine pitch linear corner cube sheet and with the grooved structure oriented toward the corner cube array further enhances the brightness. The second linear prism sheet is oriented about ninety degrees with respect to the first sheet.

The materials that work well for optical grooved structured films are an ultraviolet cured polymers bonded to a polyester or polycarbonate substrate, which can have abrasion resistance which is important during handling of the collimating films. If the prism tips are damaged during handling, the resulting display can have fine lines or spots that appear as less bright than surrounding areas on axis and brighter than surrounding areas off-axis. The films can be constructed from a polycarbonate material, acrylic, or other suitable material, such as disclosed in U.S. Pat. No. 5,396,350, issued to Beeson et al. on Mar. 7, 1995, the teachings of which are incorporated herein by reference. Grooved structures 22 can be formed by casting and curing oligomers on a metal mold in the presence of ultraviolet light or heat. Alternatively, grooved structures 22 can be formed by compression molding. The molds for forming the grooves can be made with fly-cutting equipment, such as on a copper drum. The drum can be coated with an suitable metal, such as nickel or chromium, to prevent corrosion.

A collimating film combination for a wedge waveguide can include a first collimating film which has prisms tilted to correct for the skew created by the waveguide wedge and diffuser layers and has a prism angle designed to optimize the user field of view plus a second collimating film oriented at ninety degrees to the first and with a symmetrical linear prism pattern. In the second collimating film, the prisms can be tilted uniformly in both directions (tilt every other prism in the opposite direction) to have a prism angle that optimizes the user field of view for this axis.

Further, performance change can be achieved by combining the diffuser into the first zone of the first collimating film to eliminate one film component. However, the focusing effect of the first surface can be lost. The diffuser can be made by employing textured films and casting the linear prisms onto the smooth side of the film or by conventional embossing, coating or printing a diffuser layer on the polyester prior to casting the linear prisms onto the diffuse layer (in this embodiment, the diffuse layer is sandwiched between the linear prisms and the substrate film), The prism and diffuse layer can be made of the same material and finish cured together, or by adding particles into the tie coat prior to casting the linear prisms onto the tie coat and by dispersing particles in the substrate sheet followed by casting linear prisms onto the substrate sheet.

After the light has passed through the first grooved layer, it is collimated to about forty-two degrees and the ninety-five degree linear prism second surface of the first film layer through refraction collimates the light to approximately +/−30 degrees. Then the light enters the grooved surface on the first surface of the second layer film where it is further collimated by refraction. The majority of the light is at +/−30 degrees from the normal as it enters the grooved surface and passes through the grooved layer with little intensity loss. The light passes through the second layer film and is further redirected through refraction and recycling by the ninety-five degree linear prism structure. The ninety-five degree prism shape helps to recycle any of the light that is still traveling at wide angles of incidence. This light can eventually emerge from the lighting system within a final +/−29 degree light distribution in both the X and Y axes.

The application of a grooved structure to the smooth surface of the linear prism films improves significantly the light collimating capability of the films by increasing light throughout at the grooved structure surface and prism interface and redirecting wide incident angle light rays while reducing wet out. Diffraction effects also play a significant role in the improved performance of the system.

The grooved optical effect should not be confused with that of reducing the specular reflectance by roughening. Roughness merely redistributes the reflected light as diffuse scattering and degrades the transmitted wavefront. With the grooved structure, there is no increase in diffuse scattering, the transmitted wavefront is redirected but not degraded.

Figure 5:
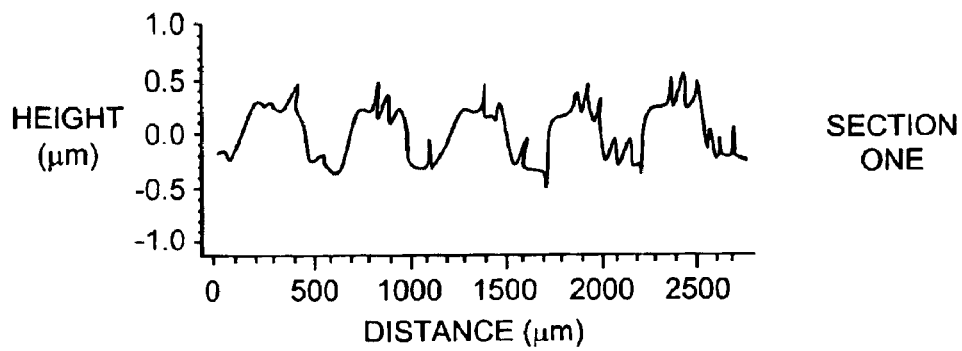
FIG. 5 shows a plot of a first surface profile with an interference microscope trace which was made across a portion of the surface of a film made with a first grooved structure.
Figure 6:
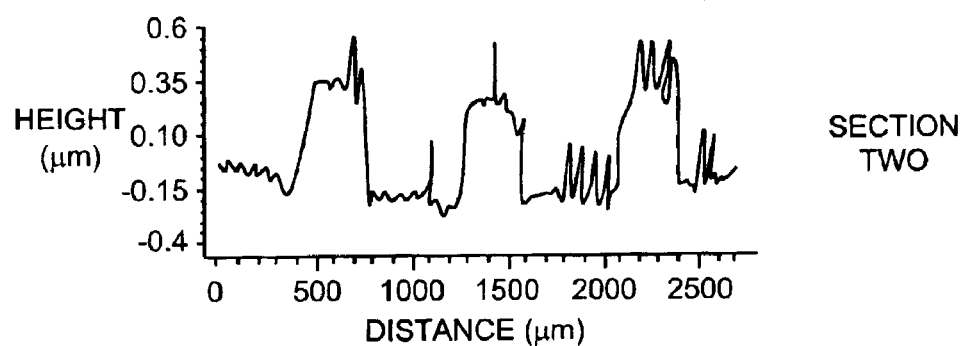
FIG. 6 shows a plot of a second surface profile with an interference microscope trace which was made across a portion of the surface of a film made with a second grooved structure.
Figure 7:
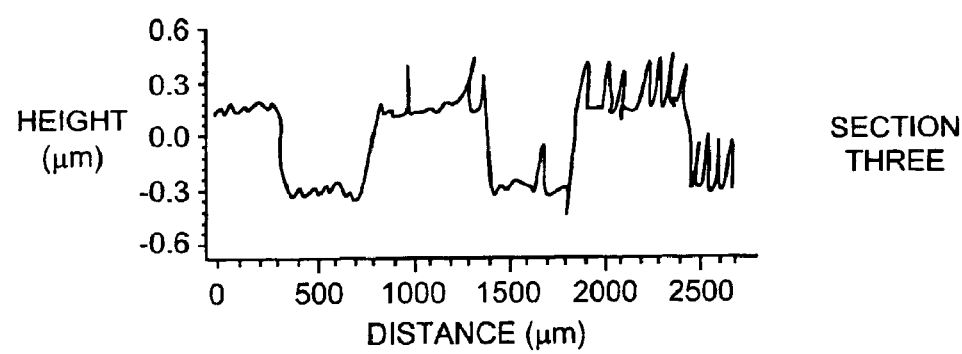
FIG. 7 shows a plot of a third surface profile with an interference microscope trace which was made across a portion of the surface of a film made with a third grooved structure.
Figure 8:
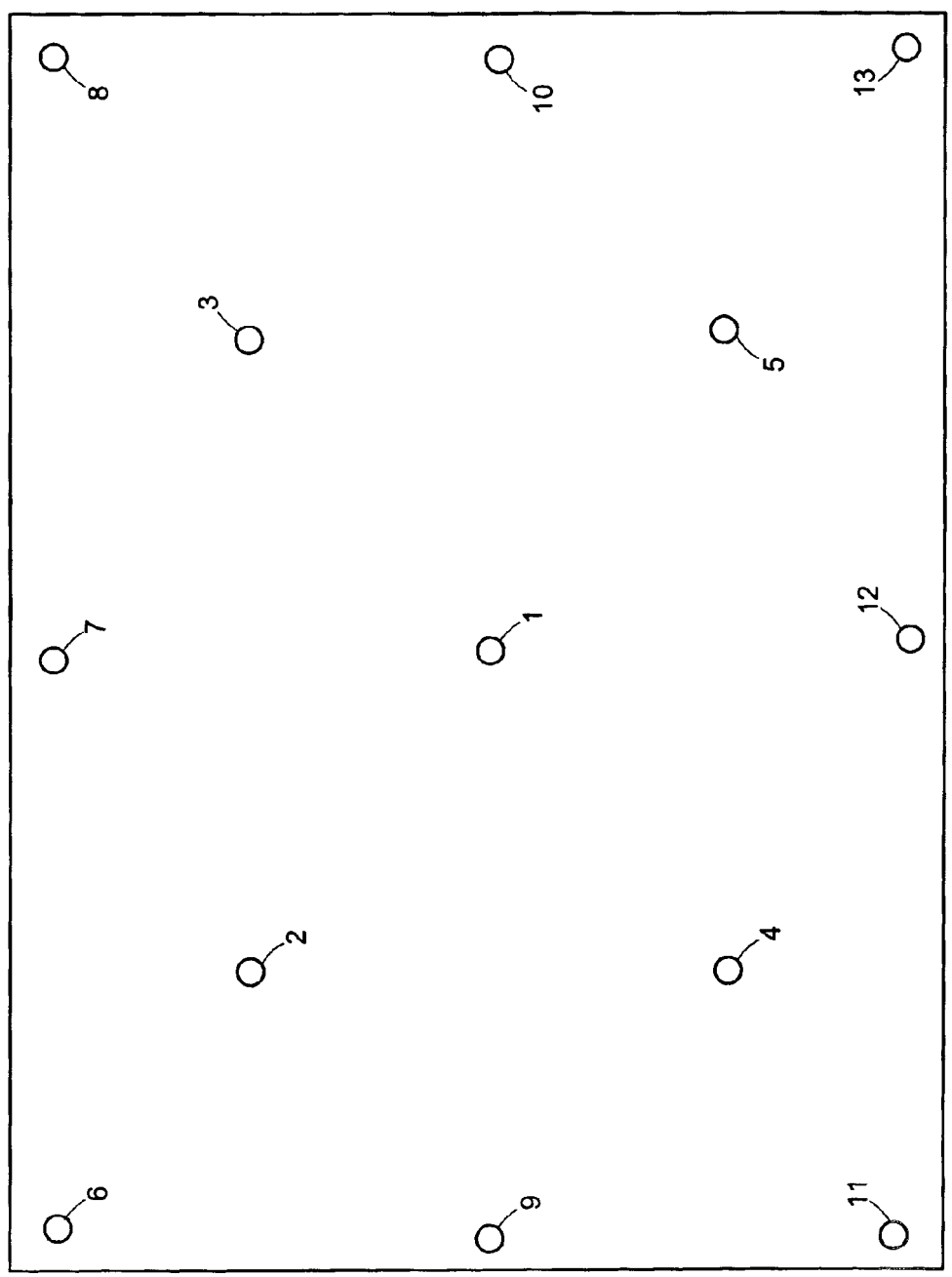
FIG. 8 shows a schematic diagram of the points measured on the film.

When measured at a fourteen inch (35.6 cm) distance from the display using a Photon Research Model No. PR650, the results with one ninety degree linear prism film having a grooved structure on the previously smooth side showed an improved brightness over one ninety degree BEF film of about 1.02. Table 1 discloses the light intensity of a twenty by twenty-five centimeter sheet with prisms peaks pointed toward the viewer and a light source on the grooved structured surface side compared to 3M BEF II film. The prisms were pitched at 48 microns between peaks. The grooved structure sheet had three sections, each having about the same area. Section one had a grooved structure with a height of about 0.5 microns, plateaus with a width of about 350 microns, and base planes with a width of about 300 microns. FIG. 5 shows a plot of a first surface profile with an interference microscope trace which was made across a portion of the surface of the film with the first grooved structure. Section two had a grooved structure with a height of about 0.5 microns, plateaus of about 350 microns and base planes of about 500 microns. FIG. 6 shows a plot of a second surface profile with an interference microscope trace which was made across a portion of the surface of the film with the second grooved structure. Section three had a grooved structure with a height of about 0.5 microns, plateaus with a width of about 600 microns and base planes with a width of about 350 microns. FIG. 7 shows a plot of a third surface profile with an interference microscope trace which was made across a portion of the surface of the film with the third FIG. 8 shows a schematic diagram of the location of the points measured on the film. The intensity of Section one of the grooved structure is shown in locations 6, 9 and 11. The intensity of Section two of the grooved structure is shown in locations 1–5, 7 and 12. Section three of the grooved structure is shown in locations 8, 10 and 13. The grooved structure with approximately same size linear prisms display greater brightness at every location except location 11.

TABLE 1

Light Throughput Comparison of Grooved Structure and 3 M BEF Film

| Location on Film | Grooved Structure | 3 M BEF |
|---|---|---|
| 1 | 1,388 cd/m$^2$ | 1,369 cd/m$^2$ |
| 2 | 1,286 | 1,279 |
| 3 | 1,329 | 1,302 |
| 4 | 1,292 | 1,270 |
| 5 | 1,269 | 1,251 |
| 6 | 1,228 | 1,153 |
| 7 | 1,198 | 1,149 |
| 8 | 1,305 | 1,256 |
| 9 | 1,250 | 1,194 |
| 10 | 1,142 | 1,113 |
| 11 | 1,190 | 1,265 |
| 12 | 1,304 | 1,254 |
| 13 | 1,170 | 1,162 |
| Sum | 16,351 | 16,017 |
| Average | 1,257.8 | 1,232.1 |
| Ratio Grooved/BEF | 1.0209 | |
| Section one sum | 3,668 | 3,612 |
| Section one average | 1,222.7 | 1,204 |
| Section one ratio | 1.0155 | |
| Section two sum | 9,066 | 8,874 |
| Section two average | 1,295.1 | 1,267.7 |
| Section two ratio | 1.0216 | |
| Section three sum | 3,617 | 3,531 |
| Section three average | 1,205.7 | 1,117 |
| Section three ratio | 1.0244 | |

While this invention has been particularly shown and described with references to embodiments thereof, it will be understood by those skilled in the art that various changes in form and details may be made therein without departing from the scope of the invention encompassed by the appended claims.

What is claimed is:

1. An optical structure film comprising a sheet having a first side and a second side, said first side includes a series of optical elements and said second side includes a series of stepped plateaus and a series of base planes that run along a first axis wherein said plateaus and base planes alternate along a second axis and said plateaus are substantially parallel but not coplanar with the base planes.

2. The optical structure film of claim 1 wherein a difference in height between said plateau and said base plane includes an amount greater than a wave length of visible light.

3. The optical structure film of claim 1 wherein a difference in height between said plateau and said base plane includes an amount in the range of between about 0.2 and about 2 microns.

4. The optical structure film of claim 1 wherein the ratio of the area of the base planes to the area of the plateaus are in a range of between about one and about ten.

5. The optical structure film of claim 1 wherein the base planes have a width in the range of between about one and about three hundred microns.

6. The optical structure film of claim 1 wherein the plateaus have a width in the range of between about one and about fifty microns.

7. The optical structure film of claim 1 wherein said linear optical elements include linear prisms that run the width of the sheeting.

8. The optical structure film of claim 1 wherein said linear optical elements include linear prisms having triangular prisms arranged side-by-side.

9. The optical structure film of claim 8 wherein said triangular prisms include a top angle in a range of between about sixty and 120 degrees.

10. The optical structure film of claim 9 wherein said linear prisms include triangular prisms that are isosceles in shape.

11. The optical structure film of claim 9 wherein said linear prisms include triangular prisms that are scalene isosceles in shape.

12. The optical structure film of claim 8 wherein said triangular prisms include a top angle in a range of between about sixty and eighty-five degrees.

13. The optical structure film of claim 8 wherein said triangular prisms include a top angle in a range of between about ninety-five and 120 degrees.

14. The optical structure film of claim 8 wherein said triangular prisms include a top angle of about eighty-eight degrees.

15. The optical structure film of claim 8 wherein said triangular prisms include a top angle of about eighty-nine degrees.

16. The optical structure film of claim 1 wherein said linear optical elements are pitched at regular intervals.

17. The optical structure film of claim 1 wherein said linear optical elements include lenticular linear elements.

18. The optical structure film of claim 1 wherein said linear optical elements are pitched in the range of between about 12.5 and about 6,500 microns.

19. A back lighting display device, comprising:
   a) a lighting device;
   b) a display panel; and
   c) a sheeting having a first side and a second side, wherein said first side includes a series of optical elements, and said second side includes a plurality of stepped plateaus and a plurality of base planes that run along a first axis wherein said plateaus and base planes alternate along a second axis and said plateaus have an elevation different than the base planes and said plateaus are substantially parallel with said base planes.

20. The display device of claim 19 further comprising a second sheeting having a first side and a second side, wherein said first side includes a series of optical elements, and said second side includes a plurality of stepped plateaus and a plurality of base planes that run along a first axis wherein said plateaus and base planes alternate along a second axis and said plateaus have an elevation different than the base planes.

21. The display device of claim 19 wherein said linear prisms include triangular prisms having a top angle of about ninety degrees.

22. The display device of claim 20 wherein said linear prisms include triangular prisms having a top angle of about ninety degrees.

23. A light directing structure, comprising:
   a) a first light directing film having a first surface with a plurality of first linear prisms having peaks and a second surface having a plurality of stepped plateaus and a plurality of base planes wherein said plateaus have an elevation different than the base plane, the plateaus and base planes being oriented in parallel relative to the peaks of said first linear prisms; and
   b) a second light directing film having a first surface with a plurality of second linear prisms having peaks and a second surface having a plurality of stepped plateaus and a plurality of base planes wherein said plateaus have an elevation different than the base plane, the plateau and base planes being substantially parallel to each other and oriented in parallel relative to the peaks of said second linear prisms.

24. The light directing structure of claim 23 wherein the plateaus of the first light directing film and the plateaus of the second light directing film face each other.

25. A method of forming a light directing film, comprising:
   forming a series of linear prisms on a first side of a sheeting, the linear prisms including peaks; and
   forming a plurality of stepped plateaus and a plurality of base planes wherein said plateaus have an elevation different than the base planes but the plateaus and base planes are substantially parallel to each other on a second side of the sheeting with the plateaus and base planes being oriented in parallel to the peaks of the linear prisms.

26. The method of claim 25 further comprising the steps of:
   forming a series of linear prisms on a first side of a second sheeting, the linear prisms also including peaks; and
   forming a plurality of stepped plateaus and a plurality of base planes wherein said plateaus have an elevation different than the base planes on a second side of the second sheeting with the plateaus and base planes being oriented in parallel relative to the peaks of the linear prisms.

27. The method of claim 25 further comprising the step of arranging the first sheeting and second sheeting such that the plateaus of the first sheeting face the plateaus of the second sheeting.

28. An optical structure film comprising a sheet having a first side and a second side, said first side includes a series of optical elements and said second side includes a series of stepped plateaus and a series of base planes that run along a first axis wherein said plateaus and base planes alternate along a second axis and said plateaus are not coplanar with the base planes and wherein a difference in height between said plateau and said base plane includes an amount greater than a wavelength of visible light.

* * * * *